Figure 1:
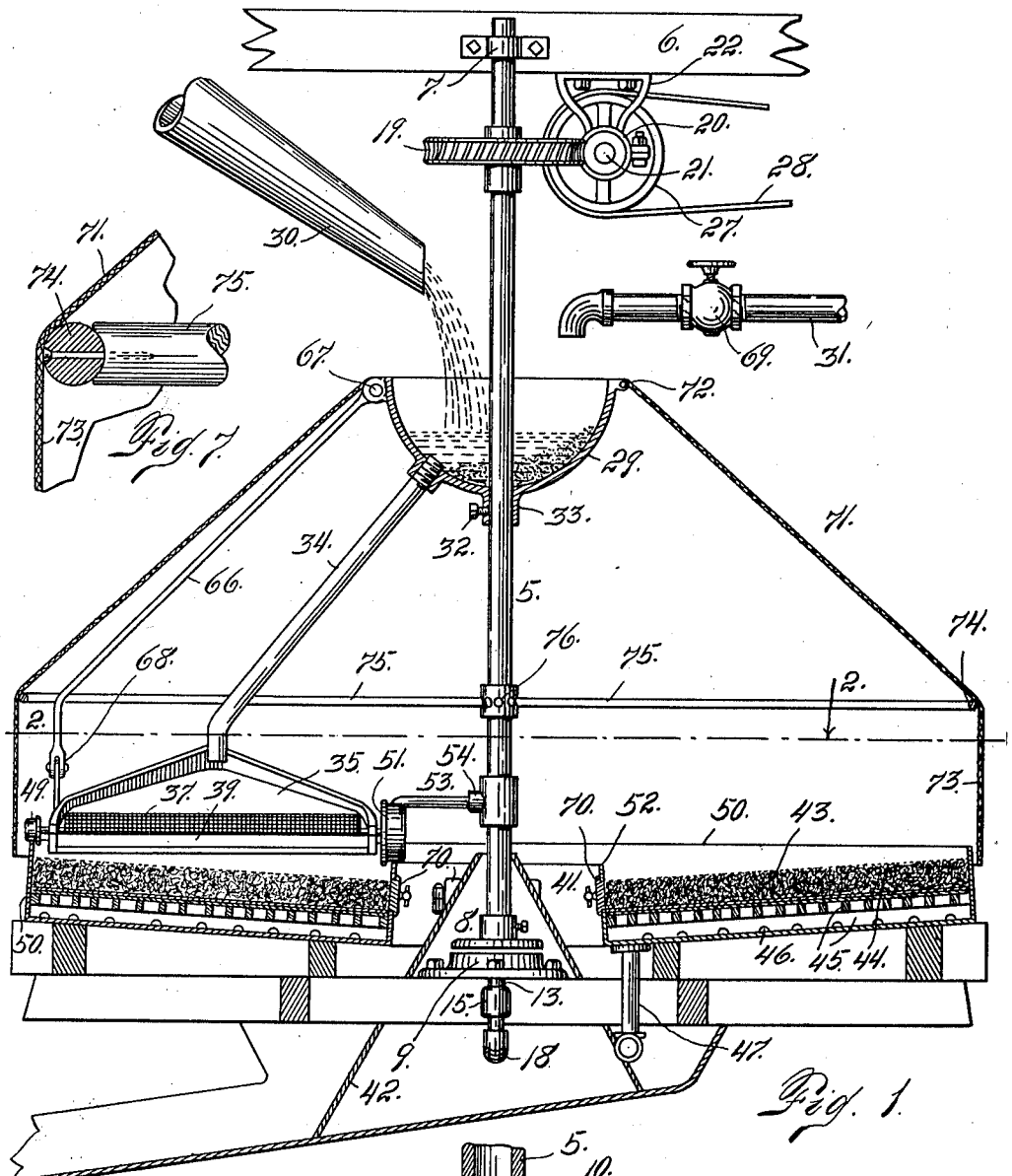

J. GROSS & L. COHEN.
APPARATUS FOR THE TREATMENT OF ORE.
APPLICATION FILED FEB. 3, 1911.

1,021,248.

Patented Mar. 26, 1912.

3 SHEETS—SHEET 1.

Witnesses
Otto E. Haddick
C. H. Roesener

Inventors
Louis Cohen
John Gross
By A. J. O'Brien
Attorney

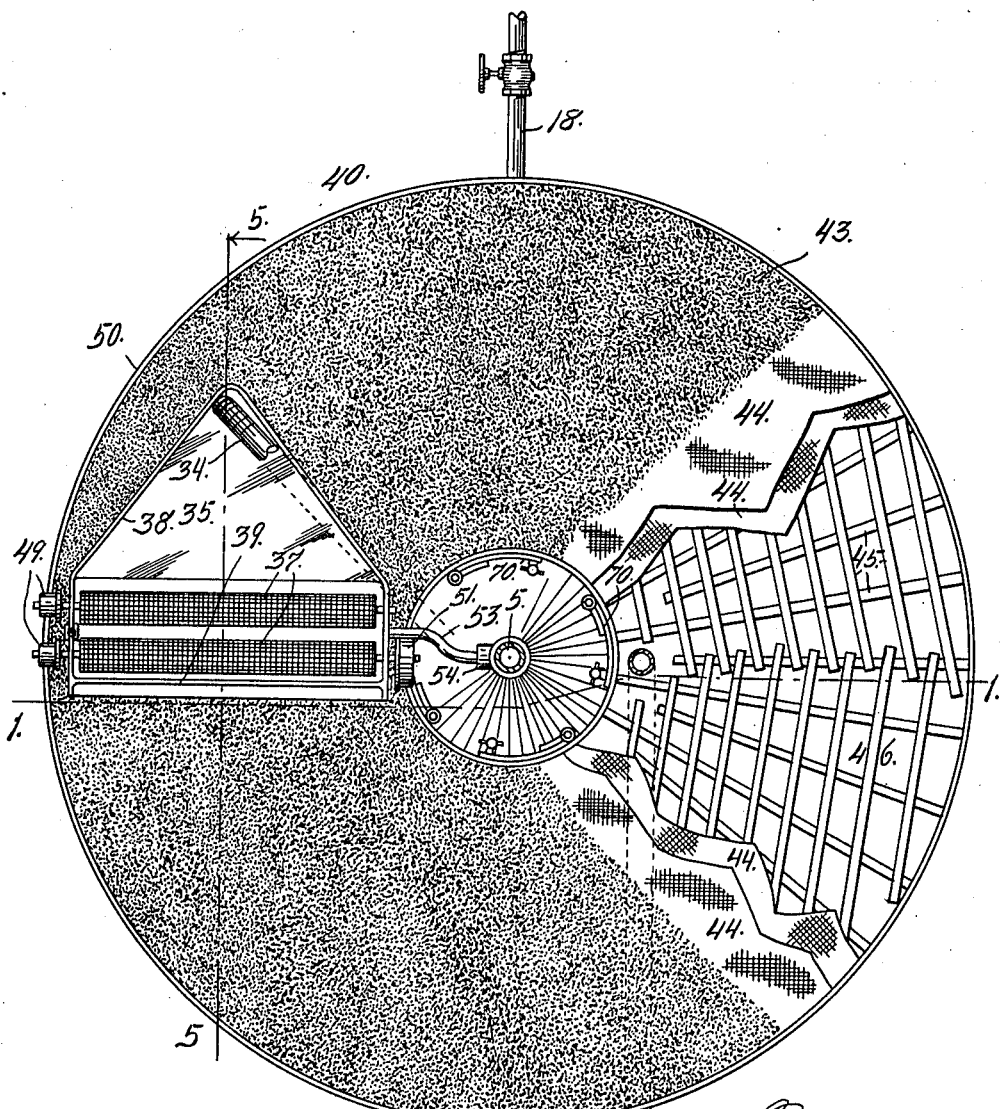

J. GROSS & L. COHEN.
APPARATUS FOR THE TREATMENT OF ORE.
APPLICATION FILED FEB. 3, 1911.

1,021,248.

Patented Mar. 26, 1912.

3 SHEETS—SHEET 3.

Witnesses
Otto E. Hoddick.
C. H. Roessner.

Louis Cohen.
John Gross.
Inventor

By
A. J. O'Brien
Attorney

UNITED STATES PATENT OFFICE.

JOHN GROSS AND LOUIS COHEN, OF DENVER, COLORADO.

APPARATUS FOR THE TREATMENT OF ORE.

1,021,248.   Specification of Letters Patent.   Patented Mar. 26, 1912.

Application filed February 3, 1911. Serial No. 606,315.

*To all whom it may concern:*

Be it known that we, JOHN GROSS and LOUIS COHEN, citizens of the United States, residing in the city and county of Denver and State of Colorado, have invented certain new and useful Improvements in Apparatus for the Treatment of Ore; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in apparatus for the treatment of ore, and while more especially adapted, as indicated in the specification, for the recovery of the metallic values by the employment of solutions, as of cyanid, for dissolving the said values, the solution being removed through the instrumentality of a vacuum pump in communication with a vacuum chamber below the filter bed upon which the ore rests, it may be employed wherever it is desired to treat material by passing fluid therethrough by virtue of suction applied to the chamber beneath the filter bed forming the support for the ore.

In our improved construction we employ a device for delivering the material to the ore receptacle and distributing it evenly thereon, the said feeder and distributer being mounted to rotate above the ore bed and upon a track formed by the inner and outer flanges of the ore receptacle, which as illustrated in the drawing is circular in shape having a central opening through which passes a rotary shaft, by means of which the feeder and distributer are actuated.

As illustrated in the drawing the shaft is rotated slowly by means of a worm gear, so that as the feeder and distributer pass around the track above the ore bed, whereby the dissolving solution is delivered to the ore, the suction may have time to act upon each portion of the ore bed, whereby the dissolving solution is drawn through the same, leaving an interval between the removal of the solution during which air or ozone may be drawn through the ore by virtue of the suction acting through the vacuum chamber underneath the ore bed, thus supplying the necessary oxygen for the treatment of the ore, with the result that the dissolving solution and the oxygen of the air or ozone are alternately passed through the bed of ore, this treatment being repeated as often as may be necessary for the purpose of removing the entire metallic contents of the ore. The number of these treatments, each consisting of the two successive steps, namely of passing the dissolving solution and the oxygen through the ore, depends upon the number of times that the feeder and the distributer pass around the ore receptacle or the number of revolutions made by the feeder and distributer during the treatment of each charge of ore, since every time the feeder and distributer make a complete revolution the entire charge of ore is subjected to the action of both the dissolving solution and the oxygen of the air or ozone.

Having briefly outlined our improved construction and defined one of its uses, we will proceed to describe the same in detail, reference being made to the accompanying drawing in which is illustrated an embodiment thereof.

Figure 8:
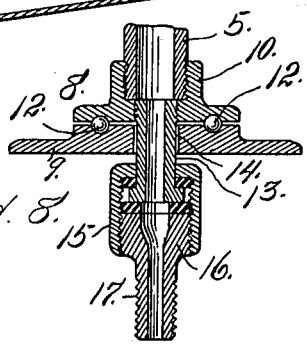
Figure 3:
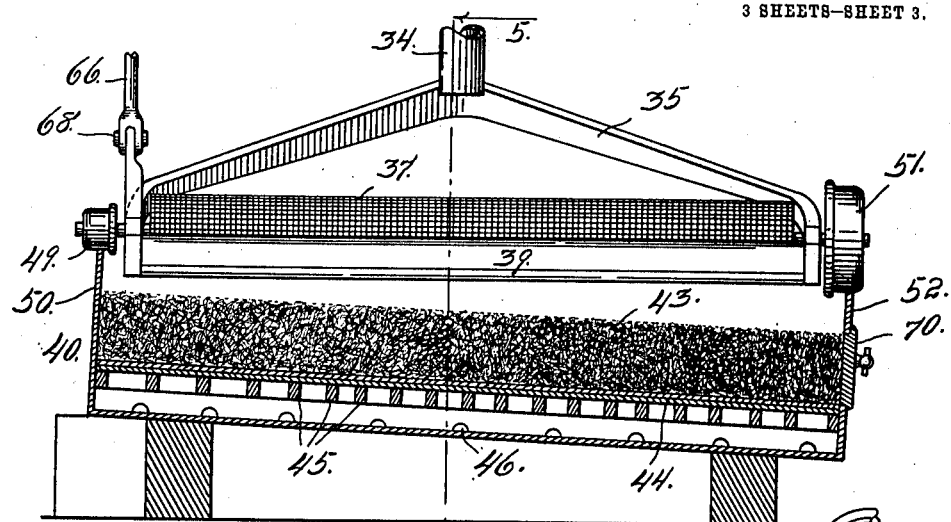
Figure 4:
Figure 5:
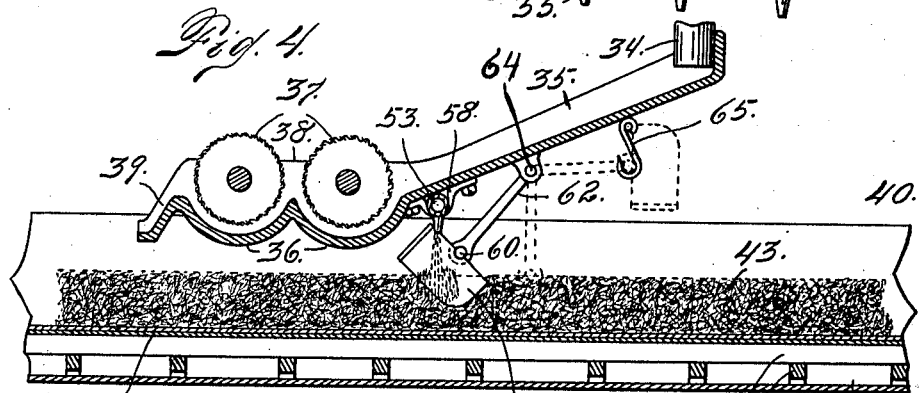
Figure 6:
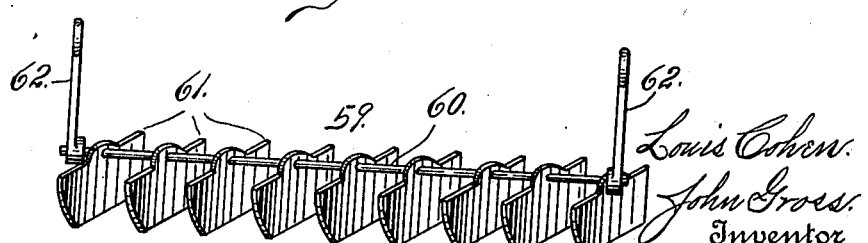

In this drawing: Figure 1 is a vertical section taken through the complete machine, the section being approximately on the line 1—1, Fig. 2. Fig. 2 is a horizontal section taken on the line 2—2, Fig. 1, being a top plan view of a rotary receptacle showing the feeder in place, the filtering medium being broken away on one side. Fig. 3 is a vertical section taken through the rotary receptacle cutting the same on one side of the center only, the feeder being shown in position. In this view the parts are shown on a larger scale. Fig. 4 is a detail view of the water feed pipe employed in connection with the apparatus, shown on a larger scale. Fig. 5 is a section taken on the line 5—5, Figs. 1 and 2, the parts being shown on a larger scale. Fig. 6 is a detail view of the rabbling device employed for removing the waste or tailings from the receptacle after the ore or material has been exhausted of its metallic values. Fig. 7 is a fragmentary detail view illustrating the manner of expanding the canvas cover above the ore receptacle. Fig. 8 is an enlarged sectional view in detail of the lower bearing of the rotary pipe showing the connection below said pipe.

The same reference characters indicate the same parts in all the views.

Let the numeral 5 designate a vertical shaft journaled at the top in a stationary frame 6 as shown at 7, its lower extremity engaging a sort of roller bearing step-box 8, the lower part 9 of which is stationary, while the upper part 10 rotates thereon, ball bearings 12 being interposed between the two members 9 and 10. A short pipe section 13 in alinement with the lower extremity of the pipe 5 is secured to the bearing member 10 and passes through an opening 14 formed in the member 9, its lower extremity terminating in a stationary coupling 15 forming a sort of stuffing box into which protrudes an enlarged part 16 merging at its lower extremity into a reduced part 17 which joins a water pipe 18, the water being passed upwardly for the purpose of sluicing off the gangue after a charge of ore has been deprived of its metallic values.

To the shaft 5 is made fast a worm wheel 19 engaging a worm 20 fast on a shaft 21, suspended by means of a support 22 attached to the frame member 6. The worm shaft is also provided with a pulley 27 engaged by a belt 28 connected with any suitable motor or source of power (not shown).

To the shaft 5 below the worm wheel is secured a sort of bowl 29 into which the material to be treated is discharged from a conduit 30 connected with any suitable source of supply (not shown). Also arranged in suitable proximity to the bowl 29 is a valve-controlled pipe 31 for supplying the solutions or water employed in the treatment of the ore. This bowl is secured to the shaft by a setbolt 32 passed through a collar 33 formed integral with the lower extremity of the bowl. To the bowl is also secured a conduit 34 which extends downwardly, being inclined outwardly from the shaft 5, its lower extremity being in communication with a trough 35 which is downwardly inclined from the lower extremity of the pipe 34 and terminates at its lower extremity in two trough-like depressions 36 into which dip distributing rolls 37 journaled in the opposite sides 38 of the trough. Beyond the depressions 36 the trough terminates in a downwardly projecting lip 39 over which the solution ore pulp or water, delivered to the trough passes into a stationary ore receptacle 40 which extends around the lower portion of the shaft 5, the said receptacle having a central opening 41 into which protrudes a stationary cone-shaped shield 42 which protects the parts composing the step-box 8 from the discharge of material from the receptacle or pan 40 during the sluicing off of the waste or tailings. This ore receptacle 40 is preferably downwardly inclined from its outer edge and the ore 43 rests upon a filtering medium 44 supported by a grating 45 which is located in a vacuum chamber 46. A pipe 47 is in communication with this vacuum chamber at one extremity, while its other extremity communicates with a pump 48 which may be of any suitable construction.

The journals of the feed rolls 37 project beyond the trough 35 and are equipped with relatively small flanged wheels 49 which engage the outer flange or rim 50 of the ore pan or receptacle 40, whereby as the trough 35 is carried around above the ore receptacle by the rotary shaft 5, the rolls are caused to rotate for the purpose of properly distributing the material delivered to the trough 35. These rolls as illustrated in the drawing, are hollow and composed of wire screen or other suitable foraminous material adapted to receive the charge delivered to the trough and distribute the same evenly as it is fed to the receptacle 40. It must be understood, however, that any suitable mechanism for distributing the material as it is discharged into the receptacle will answer the purpose. The particular description of feed rolls illustrated in the drawing, is protected by Letters Patent No. 725,932 issued to us April 21, 1903, entitled "Pulp distributer and feeder."

One of the rolls 37 has its journal opposite from that equipped with a wheel 49, provided with a loose wheel 51 which engages the inner rim or flange 52 of the ore receptacle 40, the last named flange forming a track for the wheel 51 the same as the outer flange 50 forms a track for the wheels 49.

Mounted on the pulp distributing trough 35 is a water pipe 53 whose inner extremity communicates with the hollow portion of the shaft 5 as shown at 54. The water taken from the pipe 18 passes upwardly through the lower hollow portion of the shaft 5 and enters this pipe 53, being discharged therefrom into the ore receptacle or pan 40 through nozzles 55. It will be noted that the pipe 53 after leaving the hollow shaft 5, extends downwardly as shown at 56, merging into a horizontally disposed part 57 which is directly mounted on the distributing trough 35 by means of suitable fastening devices 58. Also mounted upon the distributing trough 35 is a rabbling device 59 consisting of a rod 60 upon which are mounted plows 61 which occupy positions inclined to the circle of the travel of the distributing trough for the purpose of removing the gangue from the ore receptacle. This rabbling device is supported by two arms 62 which are pivotally connected with lugs 64 with which the distributing trough 35 is provided. By virtue of this arrangement the rabbling device may be supported above the ore receptacle during the treatment of the ore for the purpose of recovering its metallic values. In this event the rabbling device is swung to the position indicated by dotted lines in Fig. 5, being supported by a hook 65 connected with the said trough. When in this position this device is inactive during the treatment of the ore for the purpose of recovering its values. The distributing trough and its attachments are connected with the rotary shaft 5 by the water pipe 53 and also by an arm 66 whose upper extremity is secured to the bowl 29 as shown at 67, its lower extremity being connected with the outer portion of the trough 35 as shown at 68. By virtue of this connection as the shaft 5 is rotated, the distributing trough and its attachments are carried around above the ore receptacle, and the material, whether ore pulp solution or water, is evenly fed to the trough and properly distributed thereon.

In the operation of the circular machine as illustrated in the drawing, the ore or material to be treated is fed from the conduit 30 into the bowl or launder 29 and passes through the conduit 34 to the distributer 35 which travels slowly around by virtue of the worm gear connection with the shaft 5 heretofore described, the ore or pulp being in this manner distributed evenly over the filtering medium in the ore receptacle. The suction produced through the instrumentality of the pump 48 acting on the chamber 46 below the filtering medium, acts continuously so that the water or solution is drawn off rapidly through the charge 43 and filter bottom, passing thence into the vacuum chamber from which it is removed through the pipe 47 connected with the pump 48.

When the machine is loaded with a change of ore 43, the ore supply is shut off and the cyanid solution either simple or composed of complex chemicals, is turned on by opening a valve 69 in the pipe 31. This solution then enters the bowl 29 and passes through the pipe 34 to the feeder and distributer 35, whence it is delivered to the ore and is rapidly soaked through the charge, after which air is drawn through until the feeder comes back again to the same position with another fresh supply of solution. This is kept up until extraction of the gold and silver is finished, when wash water is fed to the hopper, bowl or launder 29, and is delivered to the ore charge in the same manner as the solution, for the purpose of removing any solution still remaining in the charge. When the solution has been displaced, the water is shut off and the charge then consists of waste or tailings alone, which is ready for removal.

If a preliminary treatment is necessary, it is applied, (if a solution) in the same manner as the cyanid solution, and then if necessary washed out, after which the cyanid treatment follows as described above. If the preliminary treatment material is a gas, the gas is fed over the charge in any suitable manner and the vacuum draws it through the ore.

The charge, if it is removed wet, is sluiced by means of water taken from the pipe 18 and carried upwardly through the hollow portion of the rotary shaft 5; passing thence to the pipe 53, whence it is delivered to the charge. In case of dry discharging the rabbling device 59 is employed. In this event this device is disengaged from the hook 65 allowing it to drop downwardly for the purpose, the charge of waste or tailings being sluiced or rabbled out of the receptacle through openings formed in the inner flange 52 of the ore receptacle by the opening of gates 70.

As illustrated in the drawing (see Fig. 1), the apparatus is equipped with a suitable cover 71 which is connected at its upper extremity with the bowl or launder 29 as shown at 72, its lower extremity overlapping the upper portion of the outer flange of the ore receptacle 40. Above the ore receptacle the cover is expanded to form a lower cylindrical portion 73 by means of an expanding ring 74 and radial arms 75 whose inner extremities engage sockets formed in a collar 76 on the shaft 5, and whose outer extremities engage the ring 74. This cover makes it practicable to generate ozone or other gas above the ore receptacle without any loss by dissemination in the atmosphere.

It must be understood that the cover, though shown to be composed of canvas or other flexible material, may be composed of any desired material that will accomplish the purpose. Whatever material is employed should be of such a nature that it will prevent the escape of gas from the inclosure. If ordinary canvas or other flexible material is employed it should be specially treated, whereby it becomes impervious to gas which is generated within the inclosure.

Having thus described our invention, what we claim is:

1. In apparatus of the class described, the combination of a rotary shaft, an ore receptacle surrounding the said shaft and having a central opening, the receptacle being downwardly inclined from its outer edge, the inner side wall of the receptacle having closable openings for the discharge of the waste or tailings from the receptacle, a feeder arranged to travel around the ore receptacle while delivering material thereto, the said receptacle being equipped with a water pipe in communication with the rotary shaft, the latter being formed hollow for the purpose, means for delivering water to said shaft, a rabbling device also carried by the feeder, and means for normally supporting the said device out of operative relation with the receptacle, for the purpose set forth.

2. The herein described ore treating apparatus, comprising a receptacle for the ore, a feeder and distributer, means for causing the latter to travel over the receptacle and above the same, the receptacle having a filter bed adapted to receive the ore, suction-producing means connected in operative relation with said bed, and a suitable cover for the receptacle to prevent the escape of gas employed in connection with the treatment, substantially as described.

3. In an ore treating apparatus, the combination of a circular ore receptacle downwardly inclined toward the center from its outer edge, whereby there is a tendency for the ore to travel toward the center of the receptacle, the said receptacle having a central opening, a feeder mounted to travel around the receptacle, means for actuating the feeder, means for delivering material thereto, the inner wall of the receptacle having closable openings for removing the ore from the receptacle, the receptacle having a filter bed upon which the ore is deposited, and a vacuum chamber below the said bed, substantially as described.

4. In an ore treating apparatus, the combination of a receptacle downwardly inclined toward the center from its outer edge, whereby there is a tendency for the ore to travel toward the center, the said receptacle having a central opening, a feeder mounted to travel over the receptacle, means for actuating the feeder, means for delivering material thereto, and means for treating the material within the receptacle, the inner wall of the receptacle having closable openings for removing ore therefrom, substantially as described.

5. The herein described ore treating apparatus, comprising a circular receptacle for ore, a feeder or distributer, means for causing the latter to travel over the receptacle and above the same, a rabbling device carried by the feeder, and a water supply conduit also carried by the feeder, and means for supplying water to the said conduit, substantially as described.

6. In an ore treating apparatus, the combination with an operating shaft, an ore receptacle surrounding the shaft, and having a central opening through which the shaft passes, a feeder mounted to travel in the ore receptacle and around the same, while it delivers material thereto, the feeder comprising a downwardly inclined trough having a horizontally disposed part at its lower extremity, rotatable feed rolls journaled upon the horizontally disposed part, means for rotating the said feed rolls, an operative connection between the operating shaft and the feeder, and means for initially supplying material to the feeder, substantially as described.

7. In apparatus of the class described, the combination of a vertical shaft, an ore receptacle surrounding the shaft and having a central opening through which the shaft passes, the said receptacle having inner and outer flanges forming a track, a feeder mounted to travel on the track and comprising a trough, feed rolls journaled in the said trough and carrying rolls engaging the said track for operating the feed rolls, means for initially supplying the trough with material to be treated, and a suitable connection between the shaft and the feeder for actuating the latter, substantially as described.

8. The combination of a rotary shaft, means for actuating the same, a circular ore receptacle surrounding the shaft, a feeder mounted to travel around the said receptacle while it delivers material thereto, the feeder comprising a downwardly inclined trough and revoluble feed rolls journaled at its lower extremity, a suitable connection between the feeder and the shaft, whereby feeder is actuated by the shaft, and a connection between the feed rolls and the receptacle, whereby the travel of the feeder over the receptacle causes the feed rolls to rotate, for the purpose set forth.

9. In an ore treating apparatus, the combination of an operating shaft, an ore receptacle, a feeder mounted to travel on the ore receptacle while it delivers material thereto, a feeder comprising a downwardly inclined trough having a horizontally disposed part at its lower extremity, a feed roll journaled upon the said horizontally disposed part, means for rotating the said feed roll, an operative connection between the operating shaft and the feeder, and means for initially supplying material to the feeder, substantially as described.

10. The herein described ore treating apparatus, comprising a receptacle for ore, a feeder or distributer having a discharge extremity, means for causing the latter to travel over the receptacle and above the same, a rabbling device carried by the feeder, a water supply conduit also carried by the feeder between the rabbling device and the discharge extremity of the feeder, and means for supplying material to the said conduit, for the purpose set forth.

11. The herein described ore treating apparatus, comprising a receptacle for ore, a feeder or distributer having a discharge extremity, means for causing the latter to travel over the receptacle and above the same, a rabbling device carried by the feeder forwardly of the discharge extremity of the latter, the said rabbling device being pivotally connected with the feeder, and means for retaining the said rabbling device in an inoperative position out of contact with the ore, for the purpose set forth.

In testimony whereof we affix our signatures in presence of two witnesses.

JOHN GROSS.
LOUIS COHEN.

Witnesses:
A. J. O'BRIEN,
F. E. BOWEN.

Copies of this patent may be obtained for five cents each, by addressing the "Commissioner of Patents, Washington, D. C."